(12) United States Patent
Tylik et al.

(10) Patent No.: US 11,656,795 B2
(45) Date of Patent: May 23, 2023

(54) INDICATING OPTIMIZED AND NON-OPTIMIZED PATHS TO HOSTS USING NVME-OF IN A METRO CLUSTER STORAGE SYSTEM

(71) Applicant: EMC IP Holding Company LLC, Hopkinton, MA (US)

(72) Inventors: Dmitry Nikolayevich Tylik, Westborough, MA (US); David L. Black, Acton, MA (US); Marina Shem Tov, Hod Hasharon (IL); Mukesh Gupta, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 17/154,027

(22) Filed: Jan. 21, 2021

(65) Prior Publication Data
US 2022/0229591 A1    Jul. 21, 2022

(51) Int. Cl.
G06F 12/00 (2006.01)
G06F 3/06 (2006.01)

(52) U.S. Cl.
CPC ............ *G06F 3/0659* (2013.01); *G06F 3/067* (2013.01); *G06F 3/0611* (2013.01)

(58) Field of Classification Search
CPC ....... G06F 3/0659; G06F 3/0611; G06F 3/067
See application file for complete search history.

(56) References Cited

U.S. PATENT DOCUMENTS

| | | | |
|---|---|---|---|
| 8,935,493 B1 * | 1/2015 | Dolan | G06F 3/0649 711/161 |
| 9,430,480 B1 * | 8/2016 | Bono | G06F 3/061 |
| 9,823,973 B1 * | 11/2017 | Natanzon | G06F 3/067 |
| 9,933,947 B1 * | 4/2018 | Vokaliga | G06F 3/0617 |
| 10,089,037 B1 * | 10/2018 | Bono | G06F 3/0634 |
| 10,148,483 B1 * | 12/2018 | Lippitt | H04L 67/1097 |
| 10,241,712 B1 * | 3/2019 | Elliott, IV | G06F 3/0689 |
| 10,365,980 B1 * | 7/2019 | Bromling | G06F 11/1662 |
| 10,447,524 B1 * | 10/2019 | Bono | G06F 3/0647 |
| 10,579,277 B1 * | 3/2020 | Shanmugam | G06F 3/0689 |
| 10,680,932 B1 * | 6/2020 | Colgrove | G06F 3/0683 |

(Continued)

OTHER PUBLICATIONS

NPL VMware support with NetApp MetroCluster. VMWARE Knowledge Base. Mar. 15, 2015.*

*Primary Examiner* — David Yi
*Assistant Examiner* — Tahilba O Puche
(74) *Attorney, Agent, or Firm* — BainwoodHuang

(57) ABSTRACT

A command is received from a host regarding accessing an NVMe dispersed namespace in a metro cluster configuration of storage arrays. A namespace group state corresponding to the host and the port is determined and returned to the host. The namespace group state indicates whether the specific communication path between the host and the port is optimized or non-optimized. The namespace group state indicates that the communication path is non-optimized where the host is not located at the same location as the storage array, and that the communication path is optimized where the host is located at the same location as the storage array and the node of the storage array is a preferred node for processing I/O directed to the NVMe dispersed namespace from hosts located in the same location as the storage array.

17 Claims, 3 Drawing Sheets

(56) References Cited

U.S. PATENT DOCUMENTS

| | | | |
|---|---|---|---|
| 11,089,105 B1* | 8/2021 | Karumbunathan | G06F 3/065 |
| 11,093,139 B1* | 8/2021 | Karr | G06F 3/0689 |
| 11,200,082 B2 | 12/2021 | Gupta et al. | |
| 11,226,758 B2 | 1/2022 | Tylik et al. | |
| 2016/0132411 A1* | 5/2016 | Jolad | G06F 11/2007 714/6.3 |
| 2016/0179637 A1* | 6/2016 | Winokur | G06F 11/2069 714/5.1 |
| 2018/0335975 A1* | 11/2018 | Cosby | G06F 3/0688 |
| 2018/0341579 A1* | 11/2018 | Miao | G06F 3/0631 |
| 2019/0042144 A1* | 2/2019 | Peterson | G06F 3/067 |
| 2019/0294565 A1* | 9/2019 | Pinto | G06F 3/0626 |
| 2020/0136996 A1* | 4/2020 | Li | H04L 9/0643 |
| 2020/0387307 A1* | 12/2020 | Spencer | G06F 3/0635 |
| 2020/0409890 A1* | 12/2020 | Bueb | G06F 13/4027 |
| 2021/0004171 A1* | 1/2021 | Li | G06F 3/0611 |
| 2021/0034270 A1* | 2/2021 | Gupta | G06F 13/1668 |
| 2021/0099381 A1* | 4/2021 | Puttagunta | H04L 41/12 |
| 2021/0132972 A1* | 5/2021 | Gupta | G06F 3/0688 |
| 2021/0157720 A1* | 5/2021 | Bert | G06F 3/0626 |

* cited by examiner

| Host | | Port 1A | Port 1B | Port 2A | Port 2B |
|---|---|---|---|---|---|
| Host 1 | Controller | C1A1 | C1B1 | Not connected | Not connected |
| | ANA group and state | ANAGRPID_11 Non-Optimized | ANAGRPID_11 Optimized | | |
| Host 2 | Controller | C1A2 | C1B2 | C2A2 | C2B2 |
| | ANA group and state | ANAGRPID_11 Non-Optimized | ANAGRPID_11 Optimized | ANAGRPID_21 Non-Optimized | ANAGRPID_21 Non-Optimized |
| Host 3 | Controller | C1A3 | C1B3 | C2A3 | C2B3 |
| | ANA group and state | ANAGRPID_11 Non-Optimized | ANAGRPID_11 Non-Optimized | ANAGRPID_21 Non-Optimized | ANAGRPID_21 Optimized |

ANA Group State Table 200

INDICATING OPTIMIZED AND NON-OPTIMIZED PATHS TO HOSTS USING NVME-OF IN A METRO CLUSTER STORAGE SYSTEM

TECHNICAL FIELD

The present disclosure relates generally to metro cluster storage systems, and more specifically to technology for indicating optimized and non-optimized paths to hosts using NVMe-oF in a metro cluster storage system.

BACKGROUND

Data storage systems are arrangements of hardware and software that include one or more storage processors coupled to non-volatile data storage drives, such as solid state drives. Each storage processor services host I/O requests received from host computers ("hosts"). The host I/O requests received by the storage processor may specify one or more data storage objects (e.g. volumes, virtual volumes, namespaces, etc.) that are hosted by the storage system and accessed by the hosts. Each storage processor executes software that processes the host I/O requests, and performs various data processing tasks to organize and persistently store data indicated by the host I/O requests in the non-volatile data storage drives of the data storage system. A set of one or more storage processors coupled to some number of data storage drives is sometimes referred to as a storage array. The storage processors of a storage array are sometimes referred to as the nodes of the storage array.

An active-active metro cluster (sometimes referred to as a "stretched cluster") is a storage system in which two separate storage arrays are deployed in two different locations (e.g. different data centers, different server rooms within the same data center, etc.). The storage arrays operate together to expose a single "stretched" volume of data storage to multiple hosts, such that the hosts and applications running on the hosts perceive two separate data storage volumes hosted by the two storage arrays as a single "stretched" volume. Identical "stretched volume" data is maintained by the nodes of two storage arrays in the underlying volumes using bi-directional synchronous replication or synchronous presentation (e.g., based on cache coherence) with asynchronous replication. Some advantages of using a stretched cluster include:

1. Increased data storage availability and disaster avoidance;
2. Resource balancing across different locations; and
3. Convenient data storage migration.

Metro cluster configurations are often deployed with some or all hosts having what is known as "uniform host connectivity", in which individual hosts are connected to both storage arrays.

SUMMARY

It is desirable for storage arrays in a metro cluster to indicate to the hosts that certain paths between hosts and the storage arrays have relatively lower I/O latency, and that certain other paths between hosts and the storage arrays have relatively higher I/O latency. The hosts can then select which paths they use to access the storage arrays based at least in part on such information, in combination with other information, such as path availability. For example, storage arrays in a metro cluster to which hosts attach using SCSI-based protocols such as Fibre Channel or iSCSI, may expose paths that span multiple locations as ALUA Active Non-Optimized, and local paths as ALUA Active Optimized, so that the hosts use local paths with relatively lower latency, when those paths are available.

When hosts are attached to and communicate with the storage arrays of a metro cluster configuration using NVMe-oF™ (Non-Volatile Memory Express over Fabric), as defined by NVM Express®, a stretched volume is provided by the storage arrays as a "dispersed namespace". The dispersed namespace is exposed by the storage arrays as a single NVMe (Non-Volatile Memory Express) namespace by two NVMe subsystems provided by the storage arrays. Each NVMe subsystem/storage array exposes the same identifier (e.g. NGUID (Namespace Globally Unique Identifier) or UUID (Universally Unique Identifier)) for the dispersed namespace, but different NSIDs (Namespace IDs) for the underlying constituent namespaces of the dispersed namespace that are used to store the replicated data of the dispersed namespace within the respective storage arrays. Attached hosts recognize that the two constituent namespaces exposed out of the different NVMe subsystems/storage arrays store the same data based on the NGUID or UUID of the dispersed namespace that they belong to. It would be desirable for the storage arrays of a metro cluster configuration to be able to indicate to hosts connecting to the storage arrays using the NVMe-oF protocol specific paths between the hosts and the storage arrays that advantageously provide relatively lower I/O latency.

To meet the above described and/or other technical objectives, technology is described herein that receives, through a port of a node of a storage array in a metro cluster configuration of storage arrays, a command from a host regarding accessing an NVMe dispersed namespace. A namespace group state corresponding to the host and the port of the node is determined. The namespace group state indicates whether a communication path between the host and the port is optimized. The namespace group state is returned by the node to the host responsive to the command from the host.

In some embodiments, the namespace group state indicates that the communication path between the host and the port is non-optimized in the case where the host is not located at the same location as the storage array.

In some embodiments, the namespace group state indicates that the communication path between the host and the port is optimized in the case where the host is located at the same location as the storage array and the node of the storage array is a preferred node for processing I/O directed to the NVMe dispersed namespace from hosts located in the same location as the storage array.

In some embodiments, determining the namespace group state corresponding to the host and the port of the node includes or consists of accessing a namespace group state table based on the host from which the command was received and the port through which the command was received.

In some embodiments, the command from the host regarding accessing the NVMe dispersed namespace comprises an NVMe Get Log Page command issued by the host to the NVMe logical controller corresponding to the communication path between the host and the port.

In some embodiments, the namespace group state corresponding to the host and the port of the node includes an ANA (Asymmetric Namespace Access) state.

In some embodiments, the indication that the communication path between the host and the port is non-optimized indicates that the communication path between the host and the port has higher latency than at least one other path between the host and the data storage system through which the host can access the NVMe dispersed namespace.

In some embodiments, the indication that the communication path between the host and the port is optimized indicates that the communication path between the host and the port has lower latency than at least one other path between the host and the data storage system through which the host can access the NVMe dispersed namespace.

Embodiments of the disclosed technology may provide significant technical advantages over other technical solutions. For example, the disclosed technology enables storage arrays in a metro cluster configuration to indicate optimized paths (lower I/O latency) and non-optimized paths (higher I/O latency) to hosts that communicate with the storage arrays using the NVMe-oF™ protocol, so that such hosts can preferably use the optimized paths to communicate with the storage arrays when possible. The disclosed technology enables the storage arrays in a metro cluster configuration to indicate that paths connecting non-local hosts to the storage arrays are non-optimized paths. In another example, the disclosed technology enables the storage arrays in a metro cluster configuration to indicate preferred paths connecting hosts to preferred nodes of storage arrays located in the same location as optimized paths.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 2 is a block diagram showing an example of a namespace group state table.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

Embodiments of the disclosed technology avoid shortcomings of other approaches by receiving, through a port of a node of a storage array in a metro cluster configuration of storage arrays, a command from a host regarding accessing an NVMe dispersed namespace is received over a communication path between the host and the port, and determining a namespace group state corresponding to the host and the port of the node that indicates whether the communication path between the host and the port is optimized. The namespace group state is then returned, by the node to the host responsive to the command from the host. The namespace group state may indicate that the communication path between the host and the port is non-optimized in the case where the host is not located at the same location as the storage array, and that the communication path between the host and the port is optimized in the case where the host is located at the same location as the storage array and the node of the storage array is a preferred node for processing I/O directed to the NVMe dispersed namespace from hosts located in the same location as the storage array. The namespace group state corresponding to the host and the port of the node may be determined at least in part by accessing the contents of a namespace group state table based on the host and the port. The command from the host regarding accessing the NVMe dispersed namespace over the communication path between the host and the port may include or consist of an NVMe Get Log Page command issued to an NVMe logical controller corresponding to the communication path between the host and the port. The namespace group state corresponding to the host and the port of the node may include or consist of an ANA (Asymmetric Namespace Access) state for an ANA group that includes the NVMe logical controller corresponding to the communication path between the host and the port.

Figure 1:
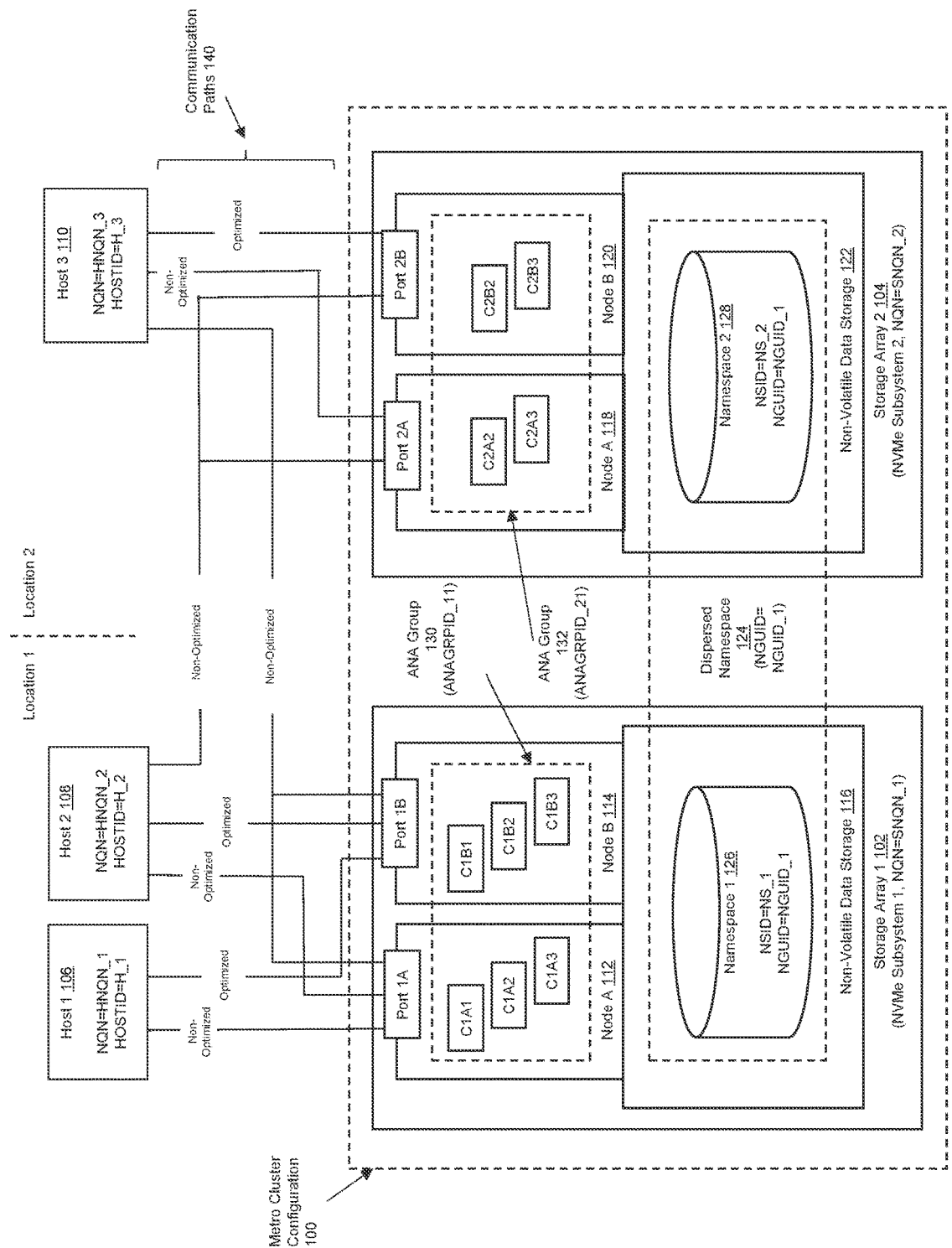
FIG. 1 is a block diagram showing an example of hosts and a metro cluster of storage arrays in which the disclosed technology is embodied.

FIG. 1 is a block diagram showing an example of hosts (e.g. hardware servers), and an active-active metro cluster configuration of storage arrays. Specifically, FIG. 1 shows a Host 1 106 having an NQN (NVMe Qualified Name) of HNQN_1 and HOSTID (Host Identifier) of H_1, Host 2 108 having an NQN of HNQN_2 and HOSTID of H_2, and Host 3 110 having an NQN of HNQN_3 and HOSTID of H_3. Host 1 106 and Host 2 108 are located in a first location, "Location 1", while Host 3 110 is located in a second location, "Location 2". Location 1 and Location 2 may be geographically dispersed data centers, separate floors within a single data center, etc.

The hosts are interconnected to a Metro Cluster Configuration 100 of storage arrays by way of Communication Paths 140. Communication Paths 140 may traverse a switched fabric communication network, and the hosts communicate with the storage arrays in Metro Cluster Configuration 100 over Communication Paths 140 using NVMe-oF™.

Metro Cluster Configuration 100 includes Storage Array 1 102, and Storage Array 2 104. Storage Array 1 102 is located in Location 1, and Storage Array 2 is located in Location 2. Storage Array 1 102 includes two storage processors, Node A 112 and Node B 114, and Non-Volatile Data Storage 116 (e.g. solid state drives). Storage Array 2 104 also includes two storage processors, Node A 118 and Node B 120, and Non-Volatile Data Storage 122 (e.g. solid state drives). Each storage processor of Storage Array 1 102 and Storage Array 2 104 includes a memory (e.g. RAM and/or other types of computer memory) storing program code that is executed on the processing circuitry of the storage processor, as well as data generated and/or used by such program code. The processing circuitry of each storage processor may, for example, include or consist of one or more microprocessors, e.g. central processing units (CPUs), multi-core processors, chips, and/or assemblies, and associated circuitry.

The processing circuitry and memory in each storage processor together form programmed electronic circuitry that is configured and arranged to carry out the various methods and functions of the technology described herein. When program code stored in the memory of a storage processor of Storage Array 1 102 and/or Storage Array 2 104 is executed by the processing circuitry of that storage processor, the respective processing circuitry of the storage processor is caused to carry out operations of the various methods and functions described herein.

Each storage processor also includes at least one network port that is operable to serve as at least part of a communication endpoint for one or more logical communication paths that connect Metro Cluster Configuration 100 to the hosts. Each port may consist of or include at least one NVMe port. For example, Node A 112 is shown including Port 1A, Node B 114 is shown including Port 1B, Node A 118 is shown including Port 2A, and Node B 120 is shown including Port 2B.

During operation of the components shown in FIG. 1, the storage arrays of Metro Cluster Configuration 100 are accessed by the hosts as individual NVMe subsystems. For example, Storage Array 1 102 is accessed as an NVMe Subsystem 1 having NQN of SNQN_1, and Storage Array 2 104 is accessed as an NVMe Subsystem 2 104 having NQN of SNQN_2.

The hosts in Location 1 and Location 2 use NVMe-oF™ over Communication Paths 140 to access Dispersed Namespace 124 within Metro Cluster Configuration 100. Dispersed Namespace 124 has an NGUID (Namespace Globally Unique Identifier) of NGUID_1. In the example of FIG. 1, Host 1 106 is configured as a "non-uniform" or "regular" host, such that it is connected to only Storage Array 1 102, while Host 2 108 and Host 3 110 are each uniformly connected to both Storage Array 1 102 and Storage Array 2 104.

Dispersed Namespace 124 is exposed as a single NVMe namespace by the NVMe subsystems (e.g. NVMe Subsystem 1 and NVMe Subsystem 2) that are provided by Storage Array 1 102 and Storage Array 2 104. Both NVMe Subsystem 1/Storage Array 1 102 and NVMe 2/Storage Array 2 104 expose the same identifier (e.g. NGUID NGUID_1) to the hosts for Dispersed Namespace 124. Dispersed Namespace 124 has two underlying constituent namespaces that are used to store the replicated data of Dispersed Namespace 124 within Storage Array 1 102 and Storage Array 2 104, i.e. Namespace 1 126 and Namespace 2 128. Namespace 1 126 and Namespace 2 128 have different NSIDs, e.g. NSID of NS_1 for Namespace 1 126 and NSID of NS_2 for Namespace 2 128, but both Namespace 1 126 and Namespace 2 128 have the same NGUID as Dispersed Namespace 124, e.g. NGUID_1. Storage Array 1 102 and Storage Array 2 104 maintain identical data in Namespace 1 126 and Namespace 2 128, e.g. through bi-directional synchronous replication or synchronous presentation (e.g., based on cache coherence) with asynchronous replication. As a result of such replication, in the event of a failure of one of the storage arrays, hosts connected to the non-failing storage array can continue accessing the data of Dispersed Namespace 124 on the surviving storage array. For example, Host 2 108 and Host 3 110 are uniformly connected to both storage arrays in Metro Cluster Configuration 100, and therefore able to seamlessly continue accessing the data of Dispersed Namespace 124 in the event of a single storage array failure involving either Storage Array 1 102 or Storage Array 2 104.

The two constituent namespaces through which Dispersed Namespace 124 can be accessed are exposed out of different NVMe subsystems/storage arrays, e.g. Namespace 1 126 exposed out of NVMe Subsystem 1/Storage Array 1 102, and Namespace 2 128 exposed out of NVMe Subsystem 2 104/Storage Array 2 104. The hosts recognize that Namespace 1 126 and Namespace 2 128 store the same data, based on the NGUID (e.g. NGUID_1) that they share with the dispersed namespace (e.g. Dispersed Namespace 124) that they support.

Each communication path between a host and an NVMe port in Metro Cluster 100 corresponds to a logical NVMe controller. The NVMe controller for a path between a host and an NVMe port is created in the memory of the node containing the NVMe port when the host connects to Metro Cluster 100 over the path. In the example of FIG. 1, the path between Host 1 106 and Port 1A corresponds to NVMe controller C1A1, the path between Host 2 108 and Port 1A corresponds to NVMe controller C1A2, the path between Host 3 110 and Port 1A corresponds to NVMe controller C1A3, the path between Host 1 106 and Port 1B corresponds to NVMe controller C1B1, the path between Host 2 108 and Port 1B corresponds to NVMe controller C1B2, the path between Host 3 110 and Port 1B corresponds to NVMe controller C1B3, the path between Host 2 108 and Port 2A corresponds to NVMe controller C2A2, the path between Host 3 110 and Port 2A corresponds to NVMe controller C2A3, the path between Host 2 108 and Port 2B corresponds to NVMe controller C2B2, and the path between Host 3 110 and Port 2b corresponds to NVMe controller C2B3.

The disclosed technology uses namespace groups. For example, the disclosed technology may use namespace groups known as ANA ("Asymmetric Namespace Access") groups. In the example of FIG. 1, a namespace group used with regard to Storage Array 1 102 is a first ANA ("Asymmetric Namespace Access") group, e.g. ANA Group 130 (having ANA group ID=ANAGRPID_11), and a namespace group used with regard to Storage Array 2 104 is a second ANA group, e.g. ANA Group 132 (having ANA group ID=ANAGRPID_21).

For a given namespace group, the nodes of the storage arrays in Metro Cluster Configuration 100 expose different namespace group states to different hosts through a single port. Specifically, within each ANA group, different namespace group states (ANA states) are determined and returned for different hosts that are connected to Metro Cluster Configuration 100 through the same NVMe port. For example, NVMe Get Log Page commands with Log Identifier 0Ch may be received from hosts with regard to different NVMe controllers that are associated with a single NVMe port of Metro Cluster Configuration 100, and the node that contains the NVMe port returns different namespace group states depending on the specific NVMe controller to which the commands are directed, thus providing individualized namespace group states for different individual communication paths. The namespace group states that are returned indicate whether specific individual paths between the host and the NVMe port are optimized (have relatively lower latency) or non-optimized path (have relatively higher latency). The state (e.g. optimized or non-optimized) for all namespaces in a given namespace group is the same for any given controller.

In the example of FIG. 1, Host 2 108 and Host 3 110 issue commands to the storage arrays in Metro Cluster Configuration 100 to discover communication paths that can be used to access Dispersed Namespace 124 through its constituent namespaces Namespace 1 126 and Namespace 2 128. Host 1 106 only discovers communication paths to access Dispersed Namespace 124 through Namespace 1 126, since Host 1 106 is only connected to Storage Array 1 102.

For example, the nodes in Metro Cluster Configuration 100 respond to an NVMe Identify command with CNS=00h issued by any host to any specific NVMe controller with an indication that the Namespace 1 126 (and accordingly Dispersed Namespace 124) is reachable through ANA Group 130 (ANAGRPID_11), regardless of the specific NVMe controller to which the command is issued by the host. Similarly, the nodes in Metro Cluster Configuration 100 respond to an NVMe Identify command with CNS=00h issued by any host to any specific NVMe controller with an indication that the Namespace 2 128 (and accordingly Dispersed Namespace 124) is reachable through ANA Group 132 (ANAGRPID_21), regardless of the specific NVMe controller to which the command is issued by the host.

Commands issued by hosts with regard to accessing Dispersed Namespace 124 further include NVMe Get Log Page commands with Log Identifier 0Ch. In response to receipt of an NVMe Get Log Page command with Log Identifier 0Ch issued by Host 1 106 through Port 1B for the controller C1B1, Node B 114 determines and returns a namespace group state (ANA state) that includes or consists of an indication of an optimized path state (e.g. 01h) for ANA Group 130 (e.g. ANAGRPID_11), indicating to Host 1 106 that the path between Host 1 106 and Port 1B is an optimized path, e.g. because Node B 114 is the preferred node for processing I/O directed to the Dispersed Namespace 124 from hosts that are located in Location 1. For example, Node B 114 may be considered the preferred node for processing I/O directed to Dispersed Namespace 124 from hosts that are located in Location 1 because Node B 114 is currently less heavily loaded than Node A 112, thus resulting in I/O processed by Node B 114 having relatively lower I/O latency than I/O processed by Node A 112. Accordingly, the indication that the communication path between the Host 1 106 and Port 1B is optimized indicates that it has lower latency than the communication path between Host 1 106 and Port 1A. The fact that Node B 114 is the preferred node for processing I/O directed to Dispersed Namespace 124 from hosts that are located in Location 1 also results in the path between Host 2 108 and Port 1B being indicated as optimized, while the paths between Host 2 108 and Ports 1A, 2A, and 2B are all indicated as non-optimized.

In response an NVMe Get Log Page command with Log Identifier 0Ch that is received from Host 3 110 through Port 1B for the controller C1B3, Node B 114 determines and returns a namespace group state (ANA state) that includes or consists of an indication of a non-optimized path state (e.g. 02h) for ANA Group 130 (e.g. ANAGRPID_11), thus indicating to Host 3 110 that the path between Host 3 110 and Port 1B is a non-optimized path. For example, Node B 114 may return a namespace group state (ANA state) that indicates to Host 3 110 that the path between Host 3 110 and Port 1B is a non-optimized path in the case where Host 3 110 is not located in the same location as Storage Array 1 102, as is the case in FIG. 1. The indication that the communication path between the Host 3 110 and Port 1B is non-optimized indicates that it has a higher latency than the path between Host 3 110 and Port 2B, since the path between Host 3 110 and Port 2B does not have to traverse the distance between Location 2 and Location 1. The path between Host 3 110 and Port 1A is also indicated as non-optimized for similar reasons.

In the example of FIG. 1, Node B 120 is the preferred node for processing I/O from hosts that are located in Location 2, such as Host 3 110. Accordingly, the namespace group state returned to Host 3 110 in response to an NVMe Get Log Page command with Log Identifier 0Ch that is received from Host 3 110 through Port 2B for the controller C2B3 includes an indication that the communication path between the Host 3 110 and Port 2B is optimized. The path between Host 3 110 and Port 2A is indicated as non-optimized, since Node A 118 is not the preferred node for processing I/O from hosts that are located in Location 2.

In some embodiments, a node receiving a command from a host regarding accessing Dispersed Namespace 124 (e.g. an NVMe Get Log Page command with Log Identifier 0Ch) determines a namespace group state (e.g. ANA state) corresponding to the host that issued the command and the port of the node on which the command was received by accessing one or more namespace group state data structures, by accessing the namespace group state data structures based on the host from which the command was received and the port through which the command was received. One example of a namespace group state data structure is a namespace group state table, such as the ANA Group State Table shown in FIG. 2, which may be indexed based on the host from which a command is received and the port through which the command was received.

As shown in FIG. 2, the ANA Group State Table 200 has rows that store namespace group identifiers (e.g. ANA group IDs) and namespace group states (e.g. ANA states) to be returned to individual hosts. ANA Group State Table 200 may be stored in the memory of each node, and used by program code executing in the node to process a command from a host regarding accessing Dispersed Namespace 124 (e.g. NVMe Get Log Page commands), in order to determine a namespace group identifier (e.g. ANA group ID) and namespace group state corresponding to the host that issued the command and the port of the node through which the command was received (e.g. a namespace group identifier and namespace group state corresponding to the specific NVMe controller to which the command was issued). The contents of ANA Group State Table 200 may, for example, be entered by a system administrator user, or automatically determined and stored by individual nodes, and reflects the specific locations of hosts and storage arrays, and the preferred nodes for processing I/O from hosts in specific locations.

Row 202 stores namespace group identifiers and namespace group states to be returned to Host 1 106. Specifically, in response to an NVMe Get Log Page command received from Host 1 106 through Port 1A (e.g. directed to NVMe controller C1A1), an ANA group identifier of ANAGRPID_11 and namespace group state (ANA state) of Non-Optimized (e.g. 02h) are returned to Host 1 106, indicating that the path between Host 1 106 and Port 1A is non-optimized. In response to an NVMe Get Log Page command received from Host 1 106 through Port 1B (e.g. directed to NVMe controller C1B1), an ANA group identifier of ANAGRP_11 and namespace group state (ANA state) of Optimized (e.g. 01h) are returned to Host 1 106, indicating that the path between Host 1 106 and Port 1B is optimized, since Node B 114 is the preferred node for processing I/O directed to Dispersed Namespace 124 from hosts in Location 1. Node A 112 may be the preferred node for processing I/O directed to other namespaces that are hosted by Storage Array 1 102.

Row 204 stores namespace group identifiers and namespace group states to be returned to Host 2 108. Specifically, in response to an NVMe Get Log Page command received from Host 2 108 through Port 1A (e.g. directed to NVMe controller C1A2), an ANA group identifier of ANAGRP_11 and namespace group state (ANA state) of Non-Optimized (e.g. 02h) are returned to Host 2 108, indicating that the path between Host 2 108 and Port 1A is non-optimized. In response to an NVMe Get Log Page command received from Host 2 108 through Port 1B (e.g. directed to NVMe controller C1B2), an ANA group identifier of ANAGRP_11 and namespace group state (ANA state) of Optimized (e.g. 01h) are returned to Host 2 108, indicating that the path between Host 2 108 and Port 1B is optimized, since Node B 114 is the preferred node for processing I/O directed to Dispersed Namespace 124 from hosts in Location 1. In response to an NVMe Get Log Page command received from Host 2 108 through Port 2A (e.g. directed to NVMe controller C2A2), an ANA group identifier of ANAGRP_21 and namespace group state (ANA state) of Non-Optimized (e.g. 02h) are returned to Host 2 108, indicating that the path between Host 2 108 and Port 2A is non-optimized, because Host 2 108 and Storage Array 2 104 are in different locations. In response to an NVMe Get Log Page command received from Host 2 108 through Port 2B (e.g. directed to NVMe controller C2B2), an ANA group identifier of ANAGRP_21 and namespace group state (ANA state) of Non-Optimized (e.g. 02h) are returned to Host 2 108, indicating that the path between Host 2 108 and Port 2B is non-optimized, also because Host 2 108 and Storage Array 2 104 are in different locations.

Row 206 stores namespace group identifiers and namespace group states to be returned to Host 3 110. Specifically, in response to an NVMe Get Log Page command received from Host 3 110 through Port 1A (e.g. directed to NVMe controller C1A3), an ANA group identifier of ANAGRP_11 and namespace group state (ANA state) of Non-Optimized (e.g. 02h) are returned to Host 3 110, indicating that the path between Host 3 110 and Port 1A is non-optimized, because Host 3 110 and Storage Array 1 102 are in different locations. In response to an NVMe Get Log Page command received from Host 3 110 through Port 1B (e.g. directed to NVMe controller C1B3), an ANA group identifier of ANAGRP_11 and namespace group state (ANA state) of Non-Optimized (e.g. 02h) are returned to Host 3 110, indicating that the path between Host 3 110 and Port 1B is non-optimized, again because Host 3 110 and Storage Array 1 102 are in different locations. In response to an NVMe Get Log Page command received from Host 3 110 through Port 2A (e.g. directed to NVMe controller C2A3), an ANA group identifier of ANAGRP_21 and namespace group state (ANA state) of Non-Optimized (e.g. 02h) are returned to Host 2 108, indicating that the path between Host 3 110 and Port 2A is non-optimized, because Node A 118 is not the preferred node for processing I/O directed to Dispersed Namespace 124 from hosts in Location 2. In response to an NVMe Get Log Page command received from Host 3 110 through Port 2B (e.g. directed to NVMe controller C2B3), an ANA group identifier of ANAGRP_21 and namespace group state (ANA state) of Optimized (e.g. 01h) are returned to Host 3 110, indicating that the path between Host 3 110 and Port 2B is optimized, because Node B 120 is the preferred node for processing I/O directed to Dispersed Namespace 124 from hosts in Location 2.

Figure 3:
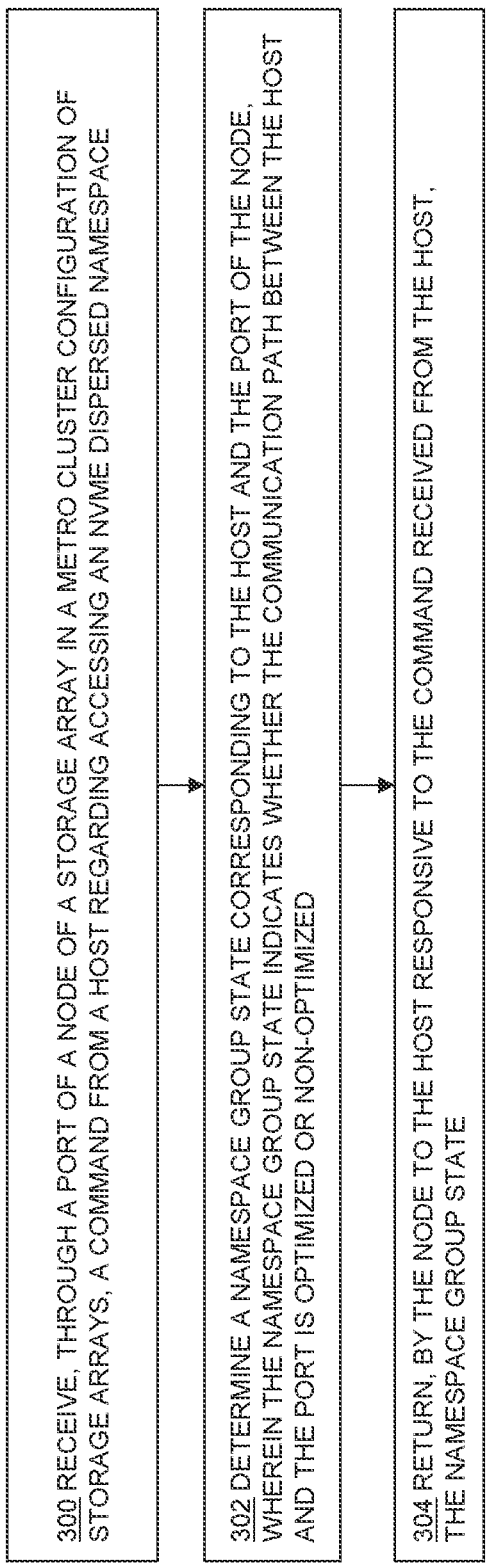
FIG. 3 is a flow chart showing steps performed in some embodiments.

FIG. 3 is a flow chart showing steps performed in some embodiments.

At step 300, a command from a host regarding accessing an NVMe dispersed namespace is received through a port of a node of a storage array in a metro cluster configuration of storage arrays.

At step 302, the node determines a namespace group state corresponding to the host and the port of the node. The namespace group state indicates whether the communication path between the host and the port is optimized or non-optimized.

At step 304, the namespace group state is returned by the node to the host in response to the command received from the host.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
 receiving, through a port of a node of a first storage array in a metro cluster configuration of storage arrays, a command from a host regarding accessing an NVMe dispersed namespace that is exposed to the host, wherein the NVME dispersed namespace is exposed to the host and at least one other host by both the first storage array and a second storage array that is also contained in the metro cluster configuration of storage arrays, wherein the NVME dispersed namespace has two underlying constituent namespaces that are used to store replicated data of the NVME dispersed namespace in the first storage array and the second storage array, wherein the host and the first storage array are located in a first location and the at least one other host and the second storage array are located in a second location, wherein the first storage array exposes a first one of the two underlying constituent namespaces to both the host and the at least one other host, and wherein the second storage array exposes a second one of the two underlying constituent namespaces to both the host and the at least one other host;

determining a namespace group state corresponding to the host and the port of the node, wherein the namespace group state indicates, based in part on a location of the host, whether a communication path between the host and the port is optimized, and wherein the namespace group state indicates that the communication path between the host and the port is non-optimized in the case where the host is not located at the same location as the first storage array; and returning, by the node to the host responsive to the command received from the host, the namespace group state.

2. The method of claim 1, wherein the namespace group state indicates that the communication path between the host and the port is optimized in the case where the host is located at the same location as the first storage array and the node of the first storage array is a preferred node for processing I/O directed to the NVMe dispersed namespace from hosts located in the same location as the first storage array.

3. The method of claim 1, wherein determining the namespace group state corresponding to the host and the port of the node comprises accessing a namespace group state data structure based on the host from which the command was received and the port through which the command was received.

4. The method of claim 3, wherein the command from the host regarding accessing the NVMe dispersed namespace comprises an NVMe Get Log Page command issued by the host to the NVMe logical controller corresponding to the communication path between the host and the port.

5. The method of claim 4, wherein the namespace group state corresponding to the host and the port of the node comprises an ANA (Asymmetric Namespace Access) state.

6. The method of claim 1, wherein the indication that the communication path between the host and the port is non-optimized indicates that the communication path between the host and the port has higher latency than at least one other path between the host and the metro cluster configuration of storage arrays through which the host can access the NVMe dispersed namespace.

7. The method of claim 2, wherein the indication that the communication path between the host and the port is optimized indicates that the communication path between the host and the port has lower latency than at least one other path between the host and the metro cluster configuration of storage arrays through which the host can access the NVMe dispersed namespace.

8. A system comprising:
processing circuitry and memory, wherein the memory has program code stored thereon, wherein the program code, when executed by the processing circuitry, causes the processing circuitry to:
receive, through a port of a node of a first storage array in a metro cluster configuration of storage arrays, a command from a host regarding accessing an NVMe dispersed namespace that is exposed to the host, wherein the NVME dispersed namespace is exposed to the host and at least one other host by both the first storage array and a second storage array that is also contained in the metro cluster configuration of storage arrays, wherein the NVME dispersed namespace has two underlying constituent namespaces that are used to store replicated data of the NVME dispersed namespace in the first storage array and the second storage array, wherein the host and the first storage array are located in a first location and the at least one other host and the second storage array are located in a second location, wherein the first storage array exposes a first one of the two underlying constituent namespaces to both the host and the at least one other host, and wherein the second storage array exposes a second one of the two underlying constituent namespaces to both the host and the at least one other host;
determine a namespace group state corresponding to the host and the port of the node, wherein the namespace group state indicates, based in part on a location of the host, whether a communication path between the host and the port is optimized, and wherein the namespace group state indicates that the communication path between the host and the port is non-optimized in the case where the host is not located at the same location as the first storage array; and
return, by the node to the host, responsive to the command received from the host, the namespace group state.

9. The system of claim 8, wherein the namespace group state indicates that the communication path between the host and the port is optimized in the case where the host is located at the same location as the first storage array and the node of the first storage array is a preferred node for processing I/O directed to the NVMe dispersed namespace from hosts located in the same location as the first storage array.

10. The system of claim 8, wherein the program code, when executed by the processing circuitry, causes the processing circuitry to determine the namespace group state corresponding to the host and the port of the node at least in part by causing the processing circuitry to access a namespace group state data structure based on the host from which the command was received and the port through which the command was received.

11. The system of claim 10, wherein the command from the host regarding accessing the NVMe dispersed namespace comprises an NVMe Get Log Page command issued by the host to the NVMe logical controller corresponding to the communication path between the host and the port.

12. The system method of claim 10, wherein the namespace group state corresponding to the host and the port of the node comprises an ANA (Asymmetric Namespace Access) state.

13. The system of claim 8, wherein the indication that the communication path between the host and the port is non-optimized indicates that the communication path between the host and the port has higher latency than at least one other path between the host and the metro cluster configuration of storage arrays through which the host can access the NVMe dispersed namespace.

14. The system of claim 9, wherein the indication that the communication path between the host and the port is optimized indicates that the communication path between the host and the port has lower latency than at least one other path between the host and the metro cluster configuration of storage arrays through which the host can access the NVMe dispersed namespace.

15. A computer program product including a non-transitory computer readable medium having instructions stored thereon, wherein the instructions, when executed on processing circuitry, cause the processing circuitry to perform steps including:

receiving, through a port of a node of a first storage array in a metro cluster configuration of storage arrays, a command from a host regarding accessing an NVMe dispersed namespace that is exposed to the host, wherein the NVME dispersed namespace is exposed to the host and at least one other host by both the first storage array and a second storage array that is also contained in the metro cluster configuration of storage arrays, wherein the NVME dispersed namespace has two underlying constituent namespaces that are used to store replicated data of the NVME dispersed namespace in the first storage array and the second storage array, wherein the host and the first storage array are located in a first location and that at least one other host and the second storage array are located in a second location, wherein the first storage array exposes a first one of the two underlying constituent namespaces to both the host and the at least one other host, and wherein the second storage array exposes a second one of the two underlying constituent namespaces to both the host and the at least one other host;

determining a namespace group state corresponding to the host and the port of the node, wherein the namespace group state indicates, based in part on a location of the host, whether a communication path between the host and the port is optimized, and wherein the namespace group state indicates that the communication path between the host and the port is non-optimized in the case where the host is not located at the same location as the first storage array; and returning, by the node to the host responsive to the command received from the host, the namespace group state.

16. The method of claim 1, wherein the namespace group state returned by the node of the first storage array to the host indicates that the communication path between the host and the first storage array is optimized, based at least in part on a determination that the host and the first storage array are both located in the first location.

17. The method of claim 16, wherein a namespace group state returned by the node of the first storage array to the at least one other host indicates that a communication path between the at least one other host and the first storage array is non-optimized, based at least in part on a determination that the at least one other host and the first storage array are not located in the same location.

* * * * *